United States Patent
Kim et al.

(10) Patent No.: US 9,899,637 B2
(45) Date of Patent: Feb. 20, 2018

(54) RECHARGEABLE BATTERY HAVING INSULATING MEMBER

(71) Applicant: SAMSUNG SDI CO., LTD., Yongin-si, Gyeonggi-do (KR)

(72) Inventors: Yong-Sam Kim, Yongin-si (KR); Mi-Yeoun Kim, Yongin-si (KR); Man-Sang Yoon, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 86 days.

(21) Appl. No.: 14/548,687

(22) Filed: Nov. 20, 2014

(65) Prior Publication Data
US 2015/0255760 A1    Sep. 10, 2015

(30) Foreign Application Priority Data
Mar. 10, 2014 (KR) .................. 10-2014-0027902

(51) Int. Cl.
| | | |
|---|---|---|
| *H01M 2/02* | (2006.01) | |
| *H01M 2/14* | (2006.01) | |
| *H01M 2/04* | (2006.01) | |
| *H01M 10/0525* | (2010.01) | |

(52) U.S. Cl.
CPC ....... *H01M 2/0277* (2013.01); *H01M 2/0217* (2013.01); *H01M 2/0237* (2013.01); *H01M 2/0275* (2013.01); *H01M 2/14* (2013.01); *H01M 2/043* (2013.01); *H01M 2/0404* (2013.01); *H01M 10/0525* (2013.01)

(58) Field of Classification Search
CPC ............. H01M 2/0277; H01M 2/0237; H01M 2/0217; H01M 2/0404; H01M 2/043; H01M 2/14; H01M 2/0275; H01M 10/0525
See application file for complete search history.

(56) References Cited

U.S. PATENT DOCUMENTS

| | | | |
|---|---|---|---|
| 6,743,546 B1 * | 6/2004 | Kaneda | H01M 2/021 429/127 |
| 7,597,995 B2 | 10/2009 | Yamauchi et al. | |
| 2004/0067416 A1 * | 4/2004 | MacLean | H01M 2/0202 429/186 |
| 2009/0123839 A1 * | 5/2009 | Soma | H01M 4/1315 429/219 |
| 2011/0052976 A1 * | 3/2011 | Ishii | H01M 2/22 429/178 |
| 2011/0117426 A1 * | 5/2011 | Choi | H01M 2/021 429/178 |
| 2011/0177396 A1 * | 7/2011 | Moriwaka | H01M 4/133 429/304 |
| 2013/0029188 A1 | 1/2013 | Kim et al. | |

FOREIGN PATENT DOCUMENTS

| | | |
|---|---|---|
| JP | 2007-226989 A | 9/2007 |
| KR | 10-2010-0099502 A | 9/2010 |
| KR | 10-2013-0012539 | 2/2013 |

* cited by examiner

*Primary Examiner* — Lisa S Park
(74) *Attorney, Agent, or Firm* — Lee & Morse P.C.

(57) ABSTRACT

A rechargeable battery includes an electrode assembly including first and second electrodes, a case having the electrode assembly embedded therein, a cap plate coupled to an opening of the case, and an insulating member between the electrode assembly and the case. The insulating member includes a first support frame and a second support frame that are spaced apart from each other and an insulating film attached to the first and second support frames.

12 Claims, 6 Drawing Sheets

RECHARGEABLE BATTERY HAVING INSULATING MEMBER

CROSS-REFERENCE TO RELATED APPLICATION

Korean Patent Application No. 10-2014-0027902, filed on Mar. 10, 2014, in the Korean Intellectual Property Office, and entitled: "Rechargeable Battery Having Insulating Member," is incorporated by reference herein in its entirety.

BACKGROUND

1. Field

Embodiments relate to a rechargeable battery having an insulating member insulating a case and an electrode assembly from each other.

2. Description of the Related Art

A rechargeable battery is a battery that may be charged and discharged, unlike a primary battery that may not be charged. A small capacity rechargeable battery may be used in a portable small electronic device such as a mobile phone, a laptop computer, and a camcorder, and a large capacity rechargeable battery may be used as a power supply for driving a motor of a hybrid vehicle, or the like.

Typical examples of the rechargeable battery include a nickel-cadmium (Ni—Cd) battery, a nickel-hydrogen (Ni-MH) battery, a lithium (Li) battery, a lithium ion (Li-ion) rechargeable battery, and the like. Particularly, the lithium ion rechargeable battery has an operating voltage about three times higher than that of the nickel-cadmium battery or the nickel-hydrogen battery that has been mainly used as a power supply of portable electronic equipment. In addition, since energy density per unit weight of the lithium ion rechargeable battery is high, the lithium ion rechargeable battery has been widely used.

SUMMARY

Embodiments are directed to a rechargeable battery including an electrode assembly including first and second electrodes, a case having the electrode assembly embedded therein, a cap plate coupled to an opening of the case, and an insulating member between the electrode assembly and the case. The insulating member includes first and second support frames that are spaced apart from each other and an insulating film attached to the first and second support frames.

The first support frame may include a first side plate and a second side plate facing each other, a support plate connecting the first side plate and the second side plate to each other in a height direction, and a base plate fixed to lower ends of the first and second side plates and the support plate.

The first support frame may include a heat fusing part to which the insulating film is fixed, the heat fusing part being connected from the base plate to an upper portion of the first side plate.

The insulating member may include first and second side surface films attached to the first and second side plates, respectively, and a bottom film attached to the base plate.

The insulating film may be integrally formed and may include a first side surface support part attached to the first side plate, a bottom support part bent from the first side surface support part and attached to the base plate, and a second side support part bent from the bottom support part and attached to the second side plate.

The insulating member may be open in a direction toward the cap plate.

The support frame may be made of a TEFLON®-based resin.

The insulating member may have a rectangular transversal cross-section.

A side end of the electrode assembly may include a current collecting tab electrically connected to a terminal. A lower portion of the current collecting tab may be inserted into the support frame.

An electrolyte inserted into the case may be positioned in the insulating member such that the electrolyte does not directly contact inner side walls or a bottom of the case.

The first support frame and the second support frame may be at opposite ends of the electrode assembly from each other. The first support frame and the second support frame may each include a first side plate and a second side plate facing each other, a support plate connecting the first side plate and the second side plate to each other in a height direction, and a base plate fixed to lower ends of the first and second side plates and the first support plate.

The insulating member may include a first side surface film, a second side surface film, and a bottom film, the first side surface film being attached to the first side plate of the first support frame and the first side plate of the second support frame, the second side surface film being attached to the second side plate of the first support frame and the second side plate of the second support frame, and the bottom film attached to the base plate of the first support frame and the base plate of the second support frame.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, dimensions may be exaggerated for clarity of illustration. Like reference numerals refer to like elements throughout.

Figure 1:
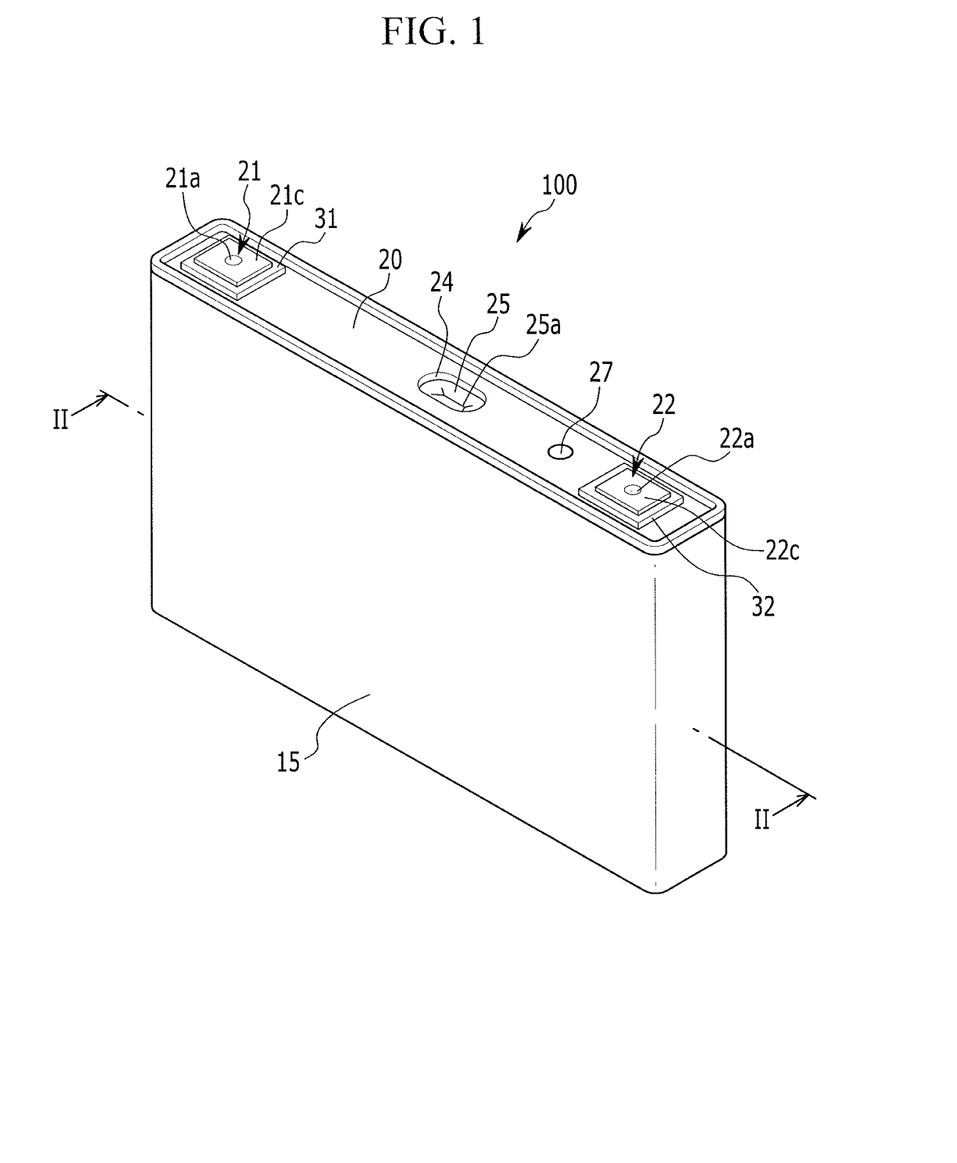
FIG. 1 illustrates a perspective view of a rechargeable battery according to an exemplary embodiment.
Figure 2:
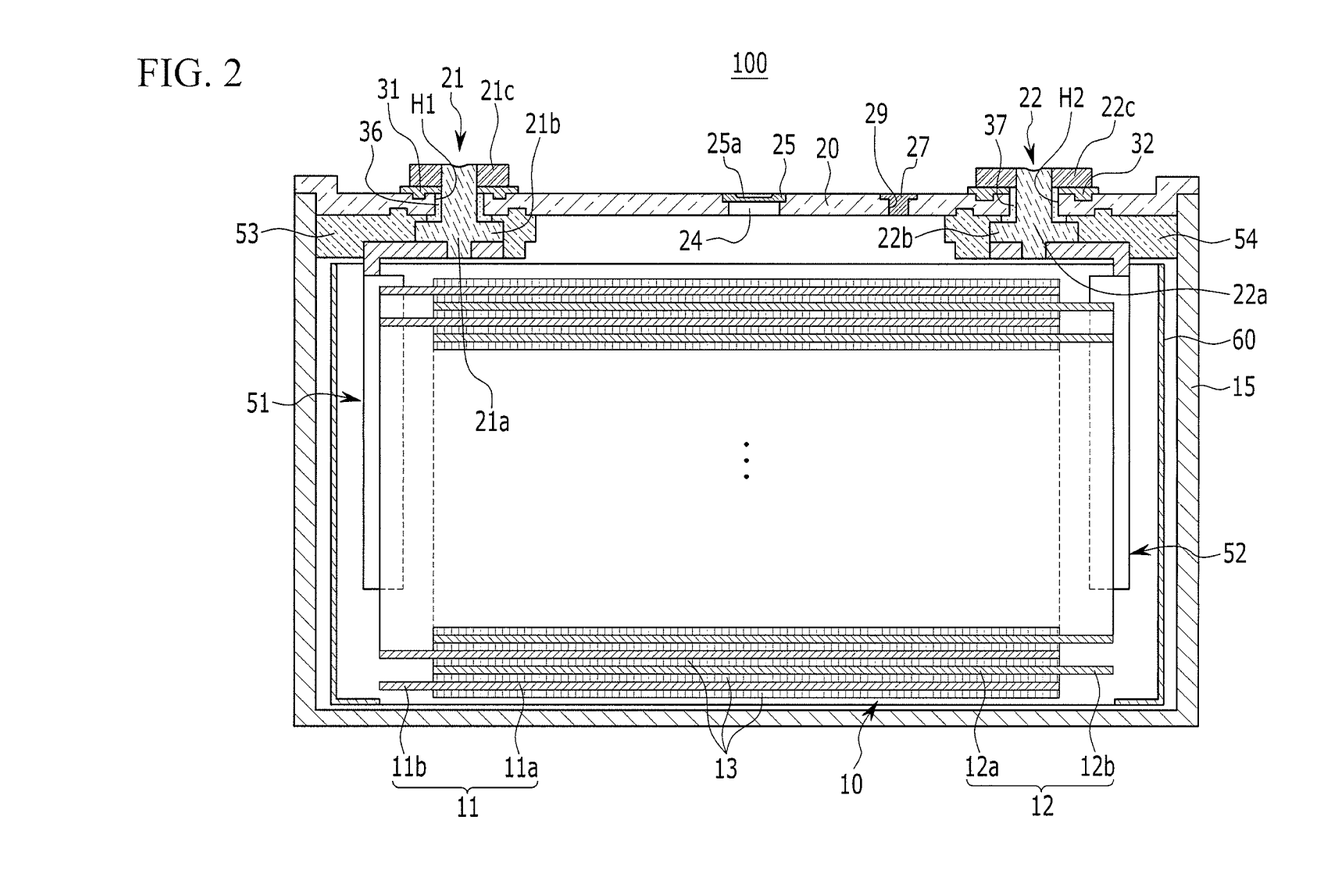
FIG. 2 illustrates a cross-sectional view taken along line II-II of FIG. 1.

FIG. 1 illustrates a perspective view of a rechargeable battery according to an exemplary embodiment, and FIG. 2 illustrates a cross-sectional view taken along line II-II of FIG. 1. Referring to FIGS. 1 and 2, a rechargeable battery 100 according to the exemplary embodiment is configured to include an electrode assembly 10 charging and discharging a current therein and therefrom, a case 15 having the electrode assembly 10 embedded therein, a cap plate 20 coupled to an opening of the case 15, and a first electrode terminal (hereinafter referred to as a "negative electrode terminal") 21 and a second electrode terminal (hereinafter referred to as a "positive electrode terminal") 22 installed in the cap plate 20.

For example, the electrode assembly 10 may be formed by disposing a first electrode (hereinafter referred to as a "negative electrode") 11 and a second electrode (hereinafter referred to as a "positive electrode") 12 on respective surfaces of a separator 13, which is an insulator, and winding the negative electrode 11, the separator 13, and the positive electrode 12 in a jelly roll state.

The negative electrode 11 and the positive electrode 12 may include coated parts 11a and 12a in which a current collector formed of a metal plate is applied with an active material, and uncoated parts 11b and 12b formed of a current collector that is not applied with the active material to thereby be exposed, respectively.

The uncoated part 11b of the negative electrode 11 may be formed at one end portion of the negative electrode 11 along the wound negative electrode 11. The uncoated part 12b of the positive electrode 12 may be formed at one end portion of the positive electrode 12 along the wound positive electrode 12. The uncoated parts 11b and 12b may be disposed at respective ends of the electrode assembly 10.

For example, the case 15 may be formed approximately in a shape of a rectangular parallelepiped such that a space for accommodating the electrode assembly 10 and an electrolyte is formed. The case 15 may include an opening formed in one surface of the rectangular parallelepiped in order to connect the outside and an internal space to each other. The opening may allow the electrode assembly 10 to be inserted into the case 15.

The cap plate 20 may be installed in the opening to close the case 15. For example, the case 15 and the cap plate 20 may be made of aluminum, such that the case 15 and the cap plate 20 may be welded to each other.

In addition, the cap plate 20 may include an electrolyte injection hole 29, a vent hole 24, and terminal holes H1 and H2. The electrolyte injection hole 29 allows an electrolyte to be injected into the case 15 after the cap plate 20 is coupled to the case 15. After the electrolyte is injected, the electrolyte injection hole 29 may be sealed by a sealing closure 27.

The vent hole 24 may be closed by a vent plate 25. The vent hole 24 may be used to discharge internal pressure of the rechargeable battery 100. When the internal pressure of the rechargeable battery 100 arrives at predetermined pressure, the vent plate 25 may be cut, such that the vent hole 24 may be opened. The vent plate 25 may have a notch 25a for inducing cutting.

The negative electrode terminal 21 and the positive electrode terminal 22 may be installed in the terminal holes H1 and H2 of the cap plate 20, respectively, and may be electrically connected to the electrode assembly 10. The negative electrode terminal 21 may be electrically connected to the negative electrode 11 of the electrode assembly 10, and the positive electrode terminal 22 may be electrically connected to the positive electrode 12 of the electrode assembly 10. The electrode assembly 10 may be drawn out to the outside of the case 15 through the negative electrode terminal 21 and the positive electrode terminal 22.

The negative and positive electrode terminals 21 and 22 may respectively include rivet terminals 21a and 22a, each installed in the terminal holes H1 and H2 of the cap plate 20, flanges 21b and 22b, each widely formed integrally with the rivet terminals 21a and 22a at an inner side of the cap plate 20, and plate terminals 21c and 22c disposed at an outer side of the cap plate 20, each connected to the rivet terminals 21a and 22a by riveting or welding.

Negative and positive electrode gaskets 36 and 37 may be installed between the rivet terminals 21a and 22a of the negative and positive electrode terminals 21 and 22 and inner surfaces of the terminal holes H1 and H2 of the cap plate 20, respectively, to seal and electrically insulate between the rivet terminals 21a and 22a of the negative and positive electrode terminals 21 and 22 and the cap plate 20.

The negative and positive electrode gaskets 36 and 37 may further extend so as to be installed between the flanges 21b and 22b and an inner surface of the cap plate 20, respectively, to further seal and electrically insulate between the flanges 21b and 22b and the cap plate 20. The negative and positive electrode gaskets 36 and 37 may prevent leakage of the electrolyte through the terminal holes H1 and H2 by securing the negative and positive electrode terminals 21 and 22 in the cap plate 21.

Negative and positive electrode current collecting tabs 51 and 52 electrically connect the negative and positive electrode terminals 21 and 22 to the negative and positive electrodes 11 and 12 of the electrode assembly 10, respectively. The negative and positive electrode current collecting tabs 51 and 52 may be coupled to lower ends of the rivet terminals 21a and 22a, respectively. The lower ends of the rivet terminals 21a and 22a may be caulked, such that the negative and positive electrode current collecting tabs 51 and 52 are connected to the lower ends of the rivet terminals 21a and 22a, respectively, while being supported by the flanges 21b and 22b, respectively.

Lower insulating members 53 and 54 may be installed between the negative and positive electrode current collecting tabs 51 and 52 and the cap plate 20, respectively, to electrically insulate the negative and positive electrode current collecting tabs 51 and 52 and the cap plate 20 from each other. In addition, the lower insulating members 53 and 54 may each have one side coupled to the cap plate 20 and another side enclosing the negative and positive electrode current collecting tabs 51 and 52, the rivet terminals 21a and 22a, and the flanges 21b and 22b, respectively, to stabilize a connection structure between them.

The cap plate 20 may be electrically connected to either one of the negative electrode terminal 21 and the positive electrode terminal 22. In this exemplary embodiment, the cap plate 20 is electrically connected to the positive electrode terminal 22.

An upper insulating member 31 of the negative electrode terminal 21 side is installed between the plate terminal 21c and the cap plate 20 to electrically insulate the plate terminal 21c and the cap plate 20 from each other. The cap plate 20 may be maintained in a state in which the cap plate 20 is electrically insulated from the negative electrode terminal 21.

For example, the upper insulating member 31 may be interposed between the plate terminal 21c and the cap plate 20. The rivet terminal 21a may penetrate through the upper insulating member 31. The upper insulating member 31 and the plate terminal 21c may be coupled to an upper end of the rivet terminal 21a. The upper end of the rivet terminal 21a may be caulked, such that the upper insulating member 31 and the plate terminal 21c are coupled to the upper end of the rivet terminal 21a.

The negative electrode gasket 36 may extend to be installed between the rivet terminal 21a and the upper insulating member 31. That is, the negative electrode gasket 36 may further reinforce sealing and electrical insulation between the rivet terminal 21a and the upper insulating member 31.

A top plate 32 of the positive electrode terminal 22 side may be formed of a conductive member. The top plate 32 may be installed between the plate terminal 22c and the cap plate 20 to electrically connect the plate terminal 22c and the cap plate 20 to each other. The cap plate 20 may be maintained in a state in which the cap plate 20 is electrically connected to the electrode assembly 10 through the positive electrode terminal 22.

For example, the top plate 32 may be interposed between the plate terminal 22c and the cap plate 20 and may have the rivet terminal 22a penetrating therethrough. The top plate 32 and the plate terminal 22c may be coupled to an upper end of the rivet terminal 22a. The upper end of the rivet terminal 22a may be caulked, such that the top plate 32 and the plate terminal 22c may be coupled to the upper end of the rivet terminal 22a.

The positive electrode gasket 37 may further extend and be installed between the rivet terminal 22a and the top plate 32. The positive electrode gasket 37 may prevent the rivet terminal 22a and the top plate 32 from being electrically connected directly to each other. The rivet terminal 22a may be electrically connected to the top plate 32 through the plate terminal 22c and may be electrically connected to the cap plate 20 through the top plate 32.

The case 15 and the electrode assembly 10 may have an insulating member 60 installed therebetween for insulation.

Figure 3:
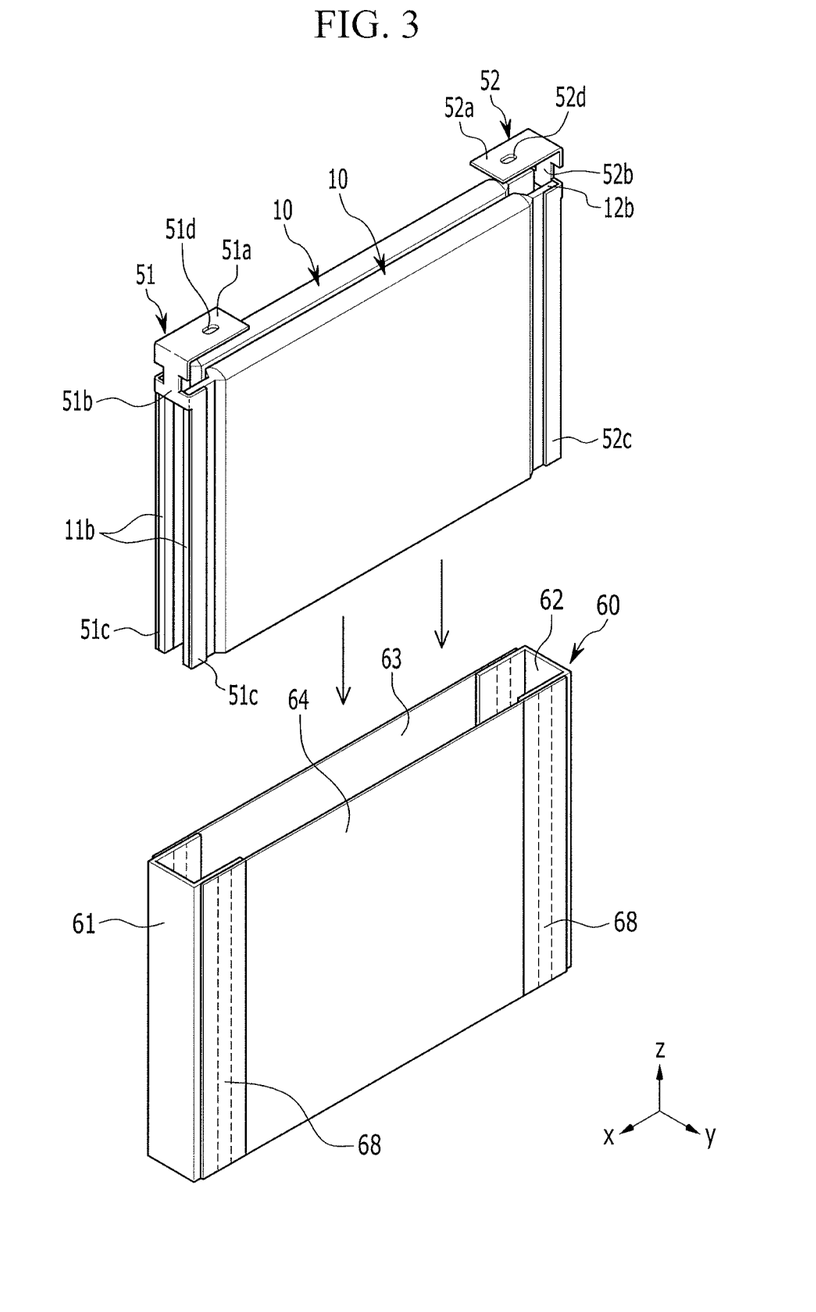
FIG. 3 illustrates an exploded perspective view of an electrode assembly and an insulating member according to an exemplary embodiment.
Figure 4:
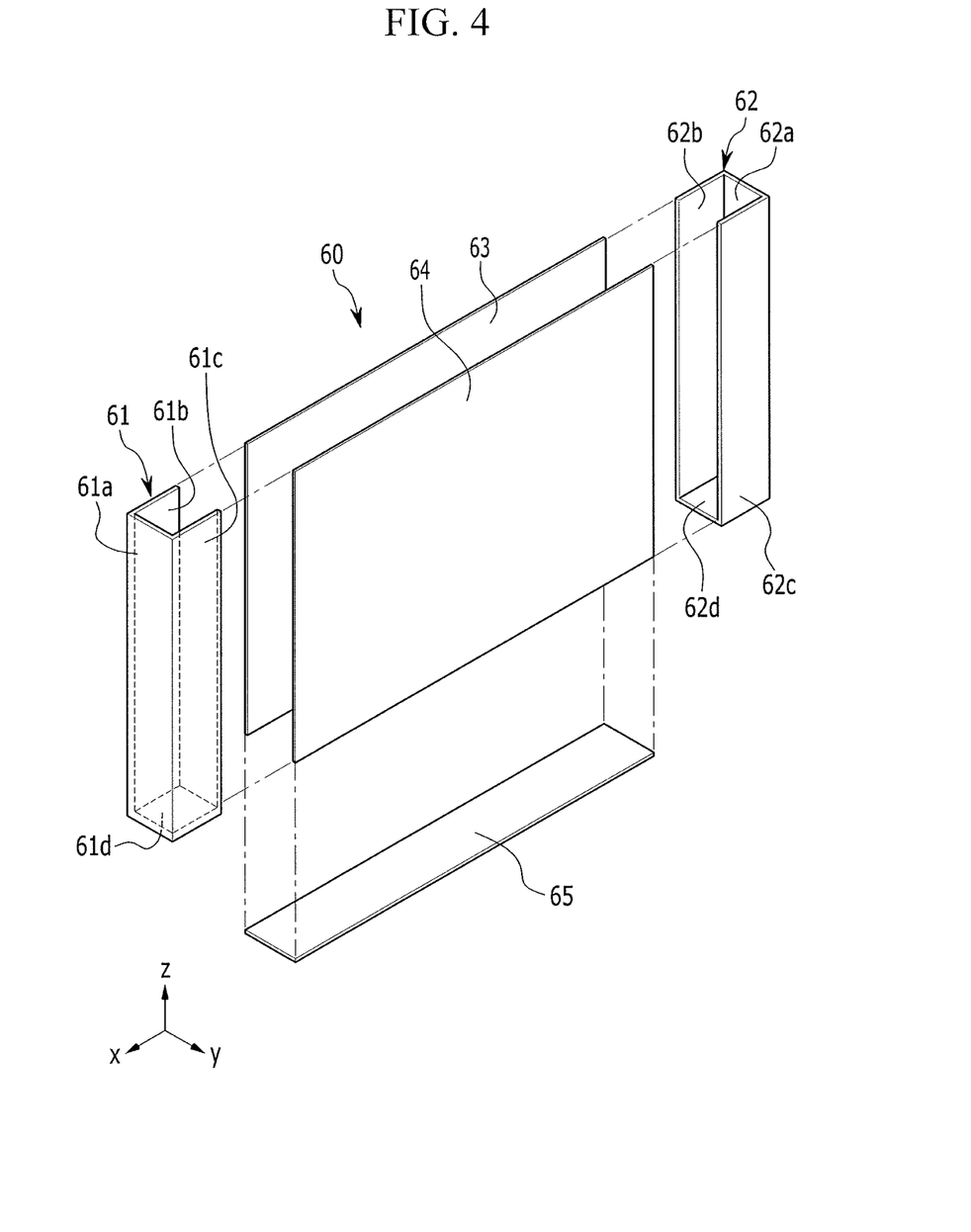
FIG. 4 illustrates an exploded perspective view of an insulating member according to an exemplary embodiment.

FIG. 3 illustrates an exploded perspective view of an electrode assembly and an insulating member according to the present exemplary embodiment, and FIG. 4 illustrates an exploded perspective view of an insulating member according to this exemplary embodiment.

Referring to FIGS. 3 and 4, the insulating member 60 may include first and second support frames 61 and 62 disposed so as to face each other, and an insulating film (described below) attached to the first and second support frames 61 and 62. The first and second support frames 61 and 62 may have a thicker thickness than that of the insulating film and may be formed as a rigid body. The first and second support frames 61 and 62 and the insulating film may be made of a TEFLON®-based resin (for example, a polytetrafluoroethylene, perfluoroalkoxy, or fluorinated ethylene propylene resin).

The first support frame 61 may include first and second side plates 61b and 61c disposed so as to face each other, a support plate 61a connecting the first and second side plates 61b and 61c to each other in a height direction, and a base plate 61d fixed to lower ends of the first and second side plates 61b and 61c and the support plate 61a. The first and second side plates 61b and 61c may be disposed in parallel with each other, and the support plate 61a may connect sides of the first and second side plates 61b and 61c to each other. The base plate 61d may be fixed to the lower ends of the first and second side plates 61b and 61c.

The second support frame 62 may include first and second side plates 62b and 62c disposed so as to face each other, a support plate 62a connecting the first and second side plates 62b and 62c to each other in the height direction, and a base plate 62d fixed to lower ends of the first and second side plates 62b and 62c and the support plate 62a, similar to the first support frame 61.

The insulating film may include first and second side surface films 63 and 64 disposed in parallel with each other, and a bottom film 65 attached to the base plates 61d and 62d. The first side surface film 63 may be attached to the first side plates 61b and 62b, and the second side surface film 64 may be attached to the second side plates 61c and 62c. The bottom film 65 may be attached to the base plates 61d and 62d.

The first and second support frames 61 and 62 may be provided with heat fusing parts 68 to which the insulating film is fixed. The heat fusing parts may be formed so as to be connected from upper portions of the first side plates 61b and 62b to upper portions of the second side plates 61c and 62c through the base plates 61d and 62d, respectively. In addition, lower ends of the first and second side surface films 63 and 64 may be bonded to the bottom film 65.

The insulating member 60 may be formed so as to have an approximately rectangular cross-section by coupling between the support frames 61 and 62 and the insulating film. In addition, an upper portion of the insulating member 60 toward the cap plate 20 may be opened, and side surfaces and a lower surface of the insulating member 60 may be closed. The electrolyte may be contained only within the bounds of the insulating member and may not contact the case 15. A movement path of ions between the electrode assembly 10 and the case 15 may be blocked, such that corrosion of the case 15 may be minimized or prevented.

The first support frame 61 may be installed so as to enclose a lower portion of the negative electrode current collecting tab 51, and the second support frame 62 may be installed so as to enclose a lower portion of the positive electrode current collecting tab 52. The first and second support frames 61 and 62 may protect the current collecting tabs as described above. Accordingly, occurrence of a contact defect in the current collecting tabs due to external impact may be minimized or prevented.

Figure 5:
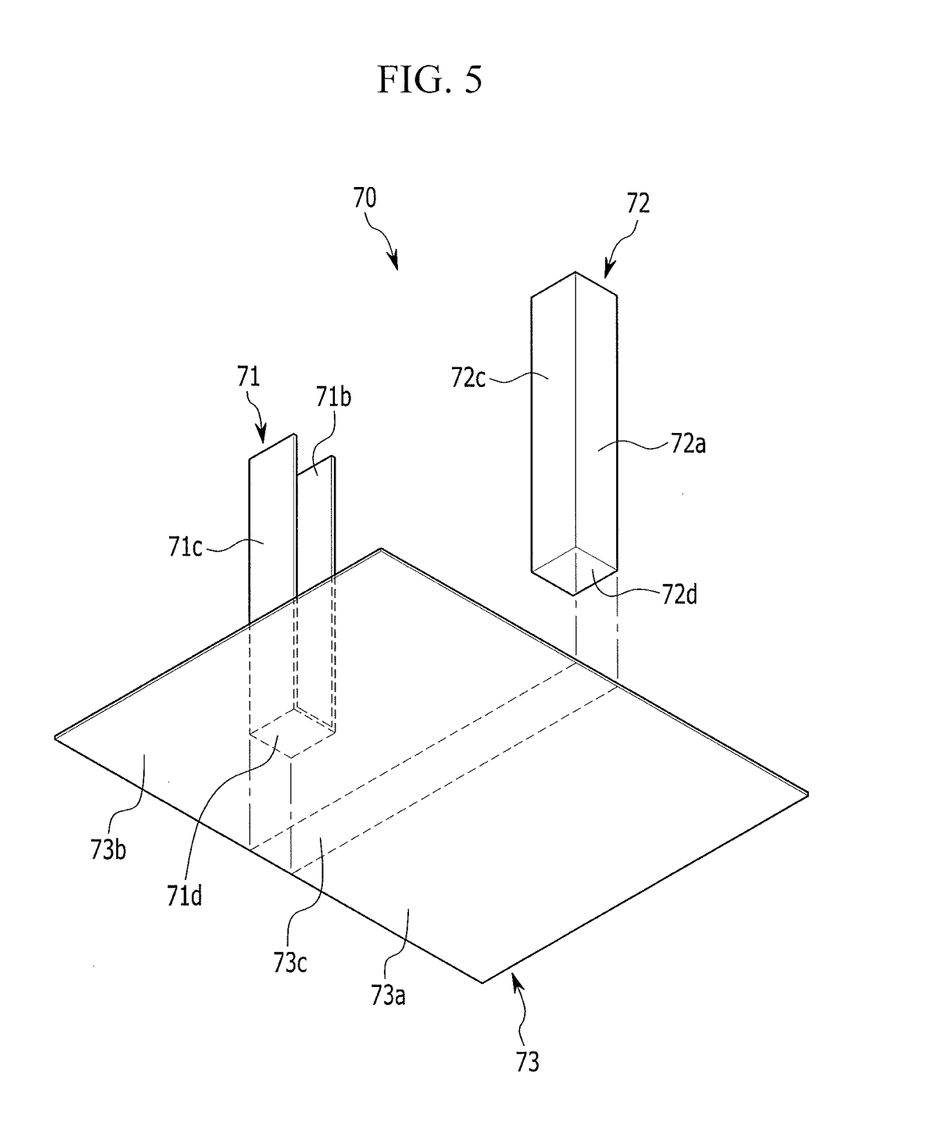
FIG. 5 illustrates an exploded perspective view of an insulating member according to another exemplary embodiment.
Figure 6:
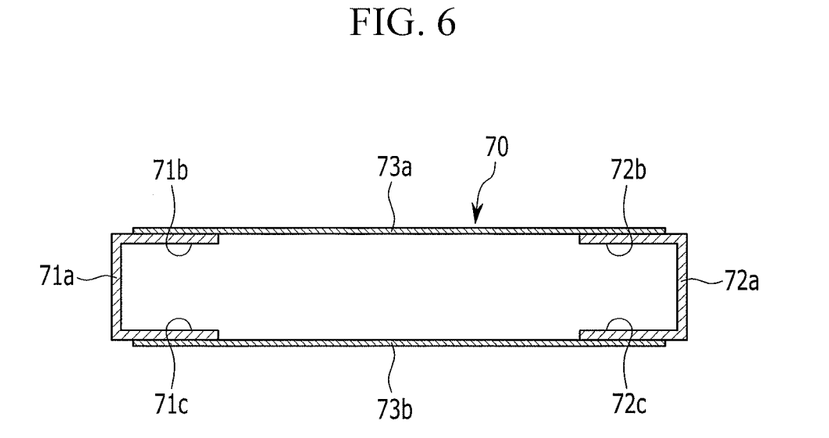
FIG. 6 illustrates a cross-sectional view of an insulating member according to the exemplary embodiment illustrated in FIG. 5.

FIG. 5 illustrates an exploded perspective view of an insulating member according to another exemplary embodiment, and FIG. 6 illustrates a cross-sectional view of an insulating member according to the exemplary embodiment illustrated in FIG. 5.

Referring to FIGS. 5 and 6, a rechargeable battery according to the present exemplary embodiment may have the same structure as that of the rechargeable battery according to the exemplary embodiment described above and illustrated in FIGS. 1-4, except for a structure of the insulating member. Therefore, overlapping description for the same portions will not be repeated.

An insulating member 70 according to the present exemplary embodiment includes first and second support frames 71 and 72 disposed so as to face each other, and an insulating film 73 attached to the first and second support frames 71 and 72. The first and second support frames 71 and 72 may have a greater thickness than t the insulating film 73 and may each be formed as a rigid body. The first and second support frames 71 and 72 and the insulating film 73 may be made of a Teflon-based resin.

The first support frame 71 may include first and second side plates 71b and 71c disposed so as to face each other, a support plate 71a connecting the first and second side plates 71b and 71c to each other in a height direction, and a base plate 71d fixed to lower ends of the first and second side plates 71b and 71c and the support plate 71a. The first and second side plates 71b and 71c may be disposed in parallel with each other, and the support plate 71a connects sides of the first and second side plates 71b and 71c to each other. The base plate 71d may be fixed to the lower ends of the first and second side plates 71b and 71c.

In addition, the second support frame 72 may include first and second side plates 72b and 72c disposed so as to face each other, a support plate 72a connecting the first and second side plates 72b and 72c to each other in the height direction, and a base plate 72d fixed to lower ends of the first and second side plates 72b and 72c and the support plate 72a, similar to the first support frame 71.

The insulating film 73 may be integrally formed and may include a first side surface support part 73a attached to the first side plates 71b and 72b, a bottom support part 73c bent from the first side surface support part 73a and attached to the base plates 71d and 72d, and a second side support part 73b bent from the bottom support part 73c and attached to the second side plates 71c and 72c.

The first side surface support part 73a may be fixed to the first side plates 71a and 72b in a state in which the first side surface support part 73a contacts the first side plates 71b and 72b from lower ends of the first side plates 71b and 72b to upper portions thereof. The second side surface support part 73b may be fixed to the second side plates 71c and 72c in a state in which the second side surface support part 73b contacts the second side plates 71c and 72c from lower ends of the second side plates 71c and 72c to upper portions thereof. In addition, the first and second side surface support parts 73a and 73b may be disposed in parallel with each other. The insulating film 73 may be fixed to the first and second support frames 71 and 72 by heat fusion.

By way of summation and review, in a rechargeable battery, a lithium-based oxide may be used as a positive active material, and a carbon material may be used as a negative active material. Generally, a battery may be classified into a liquid electrolyte battery and a polymer electrolyte battery depending on a kind of electrolyte. A battery using a liquid electrolyte is called a lithium ion battery while a battery using a polymer electrolyte is called a lithium polymer battery.

When the electrolyte contacts a case, movement of ions between the case and the electrolyte may occur, such that the case may become corroded.

Embodiments provide a rechargeable battery having advantages of preventing corrosion of a case and improving an insulation property between an electrode assembly and the case.

According to embodiments, an insulating member including a support frame and an insulating film is installed, thereby making it possible to prevent the case from contacting the electrolyte.

In addition, the support frame may be installed so as to enclose the current collecting member, thereby making it possible to prevent occurrence of a contact defect in the current collecting member due to external impact.

Further, a movement path of ions between the electrode assembly and the case may be basically blocked, thereby making it possible to prevent corrosion of the case.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A rechargeable battery, comprising:
   an electrode assembly including first and second electrodes;
   a case having the electrode assembly embedded therein;
   a cap plate coupled to an opening of the case; and
   an insulating member between the electrode assembly and the case,
   wherein the insulating member includes:
      a first support frame and a second support frame that are spaced apart from each other, and
      an insulating film that extends between, directly contacts, and is attached to outward-facing surfaces of the first and second support frames along an entire height of the first and second support frames, the insulating film being a continuous film contacting both the first and second support frames while being spaced apart from the electrode assembly.

2. The rechargeable battery as claimed in claim 1, wherein the first support frame includes a first side plate and a second side plate facing each other, a support plate connecting the first side plate and the second side plate to each other in a height direction, and a base plate fixed to lower ends of the first and second side plates and the support plate.

3. The rechargeable battery as claimed in claim 2, wherein the first support frame includes a heat fusing part to which the insulating film is fixed, the heat fusing part being connected from the base plate to an upper portion of the first side plate.

4. The rechargeable battery as claimed in claim 2, wherein:
   the insulating member includes first and second side surface films directly contacting and attached to outward-facing surfaces of the first and second side plates, respectively, and a bottom film directly contacting and attached to a bottom-facing surface of the base plate.

5. The rechargeable battery as claimed in claim 2, wherein:
   the insulating film is integrally formed and includes a first side surface support part directly contacting and attached to an outward-facing surface of the first side plate, a bottom support part bent from the first side surface support part and directly contacting and attached to a bottom-facing surface of the base plate, and a second side support part bent from the bottom support part and directly contacting and attached to an outward-facing surface of the second side plate.

6. The rechargeable battery as claimed in claim 2, wherein:
   the insulating member is open in a direction toward the cap plate.

7. The rechargeable battery as claimed in claim 2, wherein:
   the first support frame and the second support frame are each made of a polytetrafluoroethylene-based resin.

8. The rechargeable battery as claimed in claim 2, wherein:
   the insulating member has a rectangular transversal cross-section.

9. The rechargeable battery as claimed in claim 2, wherein a side end of the electrode assembly includes a current collecting tab electrically connected to a terminal, and a lower portion of the current collecting tab is inserted into the first support frame.

10. The rechargeable battery as claimed in claim 2, wherein
an electrolyte inserted into the case is positioned in the insulating member such that the electrolyte does not directly contact inner side walls or a bottom of the case.

11. The rechargeable battery as claimed in claim 1, wherein:
the first support frame and the second support frame are at opposite ends of the electrode assembly from each other, and
the first support frame and the second support frame each include a first side plate and a second side plate facing each other, a support plate connecting the first side plate and the second side plate to each other in a height direction, and a base plate fixed to lower ends of the first and second side plates and the support plate.

12. The rechargeable battery as claimed in claim 11, wherein:
the insulating member includes a first side surface film, a second side surface film, and a bottom film, the first side surface film extending between, directly contacting and being attached to an outward-facing surface of the first side plate of the first support frame and an outward-facing surface of the first side plate of the second support frame, the second side surface film extending between, directly contacting and being attached to an outward-facing surface of the second side plate of the first support frame and the second side plate of the second support frame, and the bottom film extending between, directly contacting and being attached to a bottom-facing surface of the base plate of the first support frame and the base plate of the second support frame.

* * * * *